United States Patent [19]

Snyder

[11] Patent Number: 4,726,535

[45] Date of Patent: Feb. 23, 1988

[54] MACHINE FOR REMOVING CAPS AND BASE CUPS FROM PLASTIC BOTTLES

[75] Inventor: Dale A. Snyder, Cedar Rapids, Iowa

[73] Assignee: R. S. Corcoran Company, New Lenox, Ill.

[21] Appl. No.: 542,648

[22] Filed: Oct. 17, 1983

[51] Int. Cl.[4] .............................................. B02C 23/08
[52] U.S. Cl. .................................. 241/101.2; 29/235;
29/240; 29/705; 29/710; 29/791; 29/822;
241/81
[58] Field of Search ....................... 39/235, 240, 426.1,
39/426.2, 426.3, 426.4, 426.5, 426.6, 705, 709,
710, 714, 773, 791, 822; 198/341, 345, 353, 400,
472, 617; 414/222, 223, 225, 226, 749; 53/381
A, 492; 241/81, DIG. 38, 101.2

[56] References Cited

U.S. PATENT DOCUMENTS

| 3,134,281 | 5/1964 | Mintz | 29/240 X |
|---|---|---|---|
| 3,987,535 | 10/1976 | Brown | 29/426.4 |
| 4,003,123 | 1/1977 | Duke | 29/429 |
| 4,096,620 | 6/1978 | Kontz | 29/235 X |
| 4,402,123 | 9/1983 | Mitchell | 29/426.5 X |

Primary Examiner—Howard N. Goldberg
Assistant Examiner—Joseph M. Gorski
Attorney, Agent, or Firm—Leydig, Voit & Mayer

[57] ABSTRACT

A machine for removing the closure or cap and the plastic base cup from a soft plastic bottle includes a conveyor which advances bottles sidewise along a horizontal path. During such advance, the bottles move along a stationary bar which holds the bottles against turning while the caps are engaged by a plurality of stationary serrated blade assemblies so that, due to the advance of the bottles, these assemblies turn the caps and unthread them from the bodies of the bottles. At the same time, stationary cams engage the base cups and the advance of the bottles causes the cams to pull the cups endwise off the bottoms of the bottle bodies. Subsequently, a sensor detects and is effective to separate clear bodies from colored bodies. As a result, the caps, the cups, clear bodies and colored bodies are separated for individual recycling.

7 Claims, 17 Drawing Figures

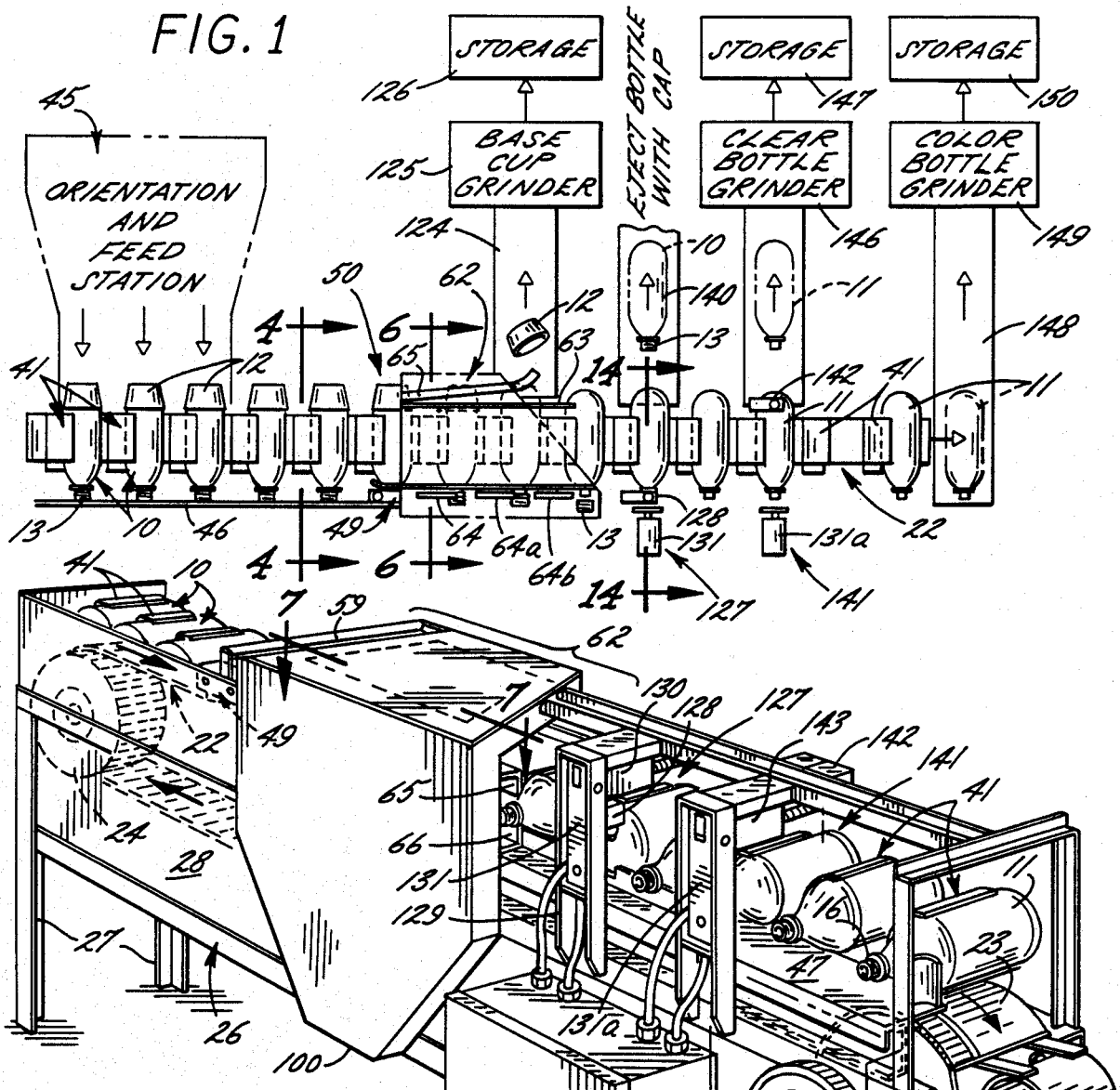
FIG. 1
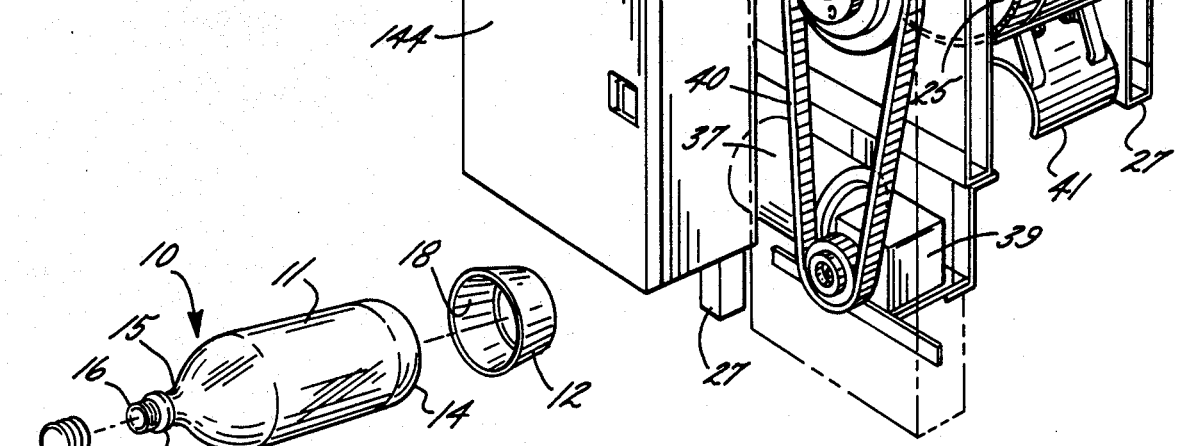
FIG. 2
FIG. 3

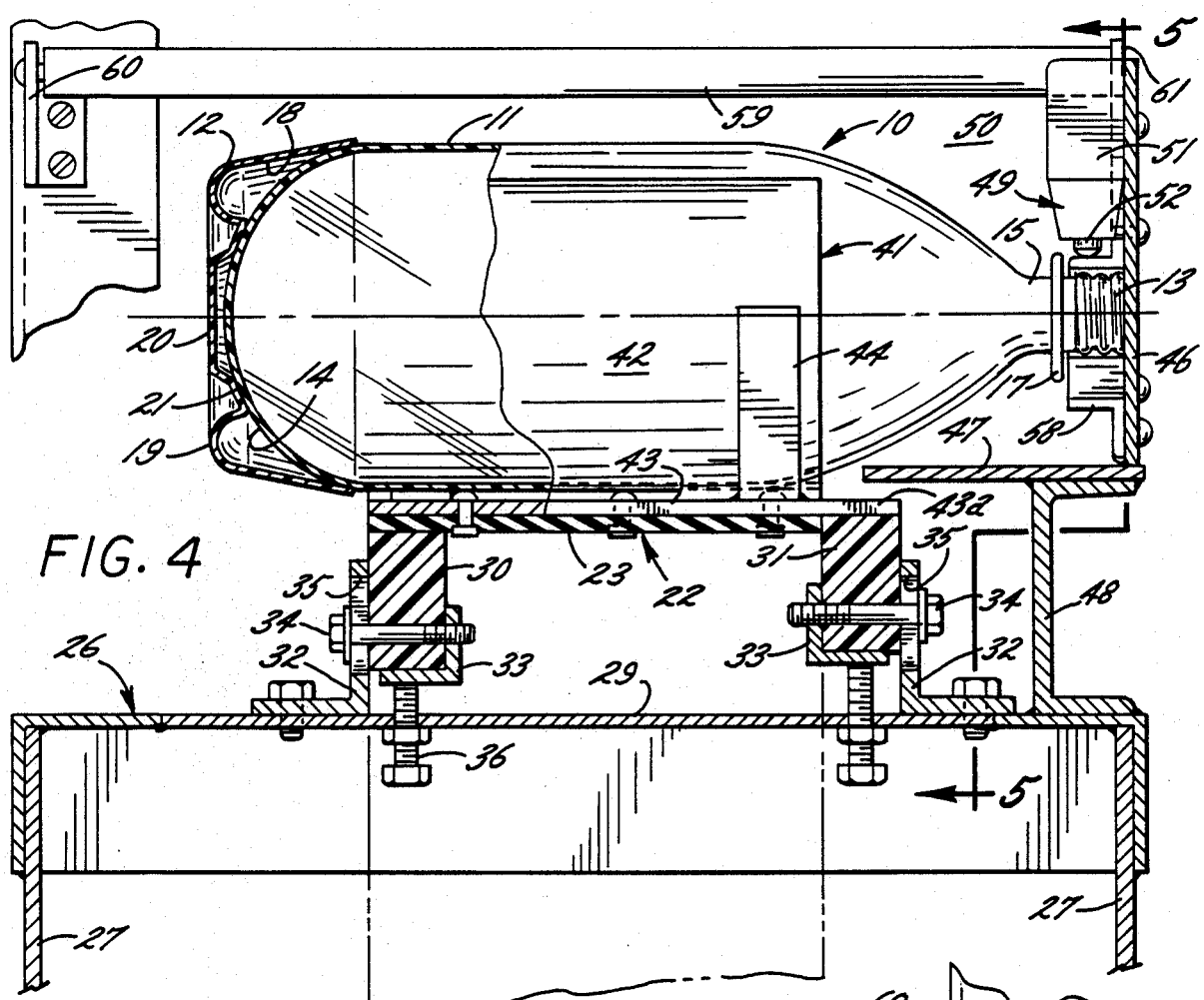
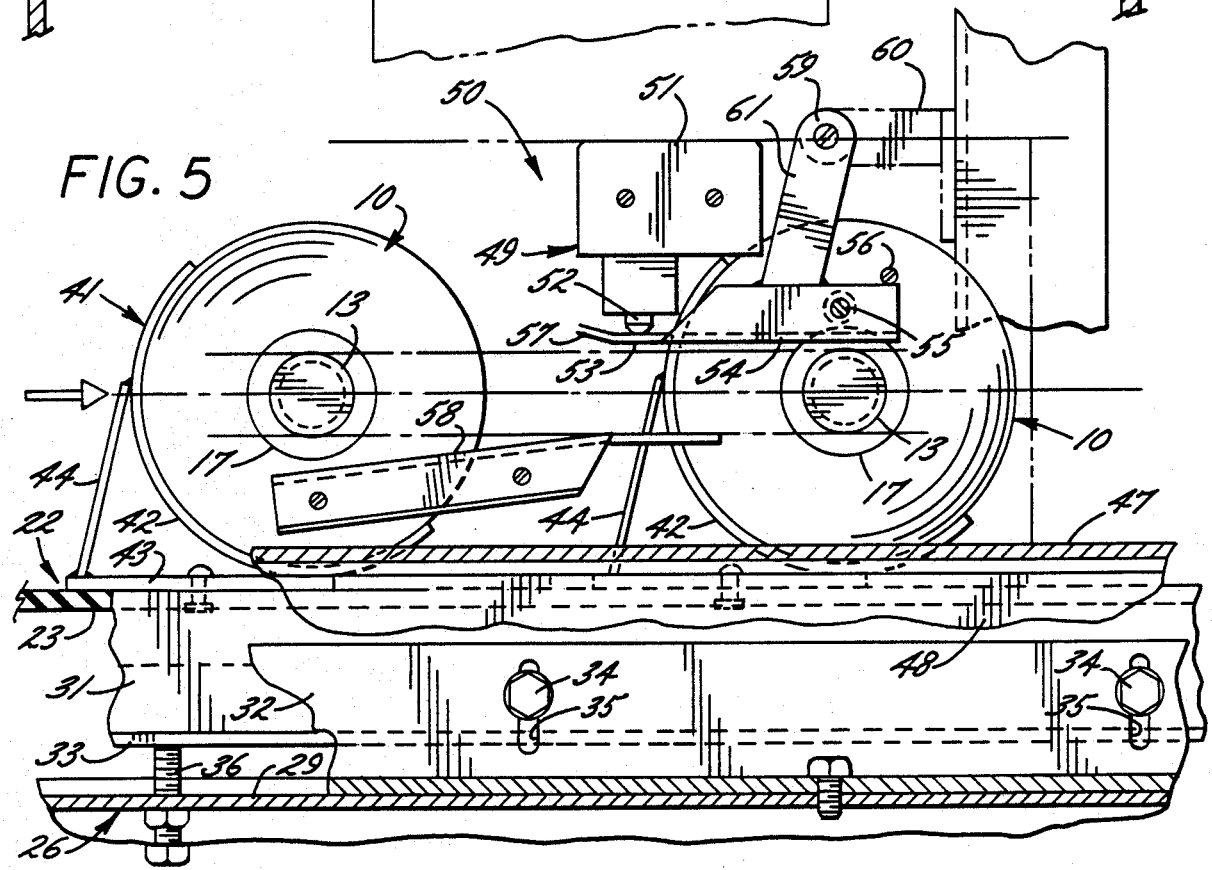

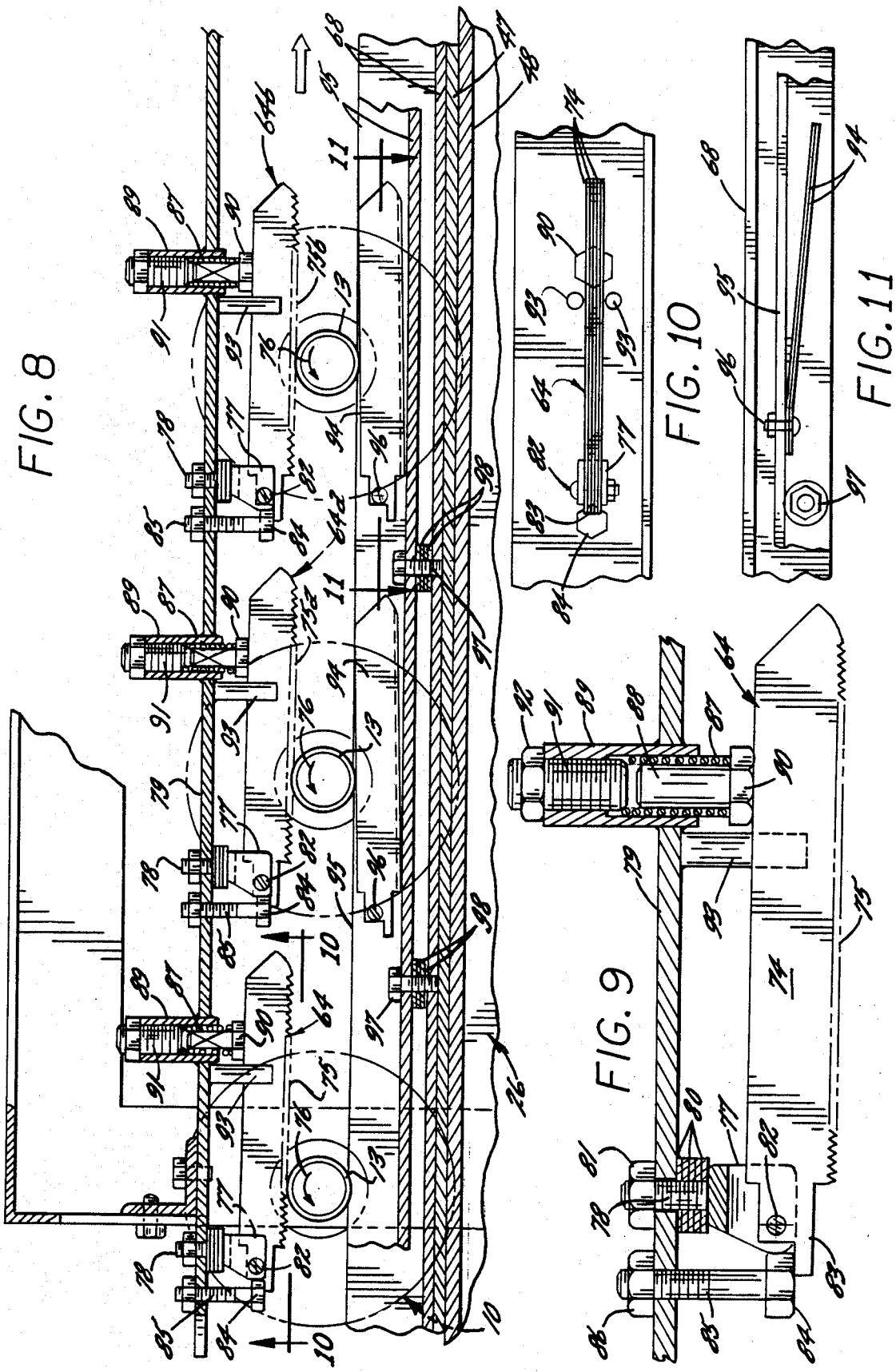

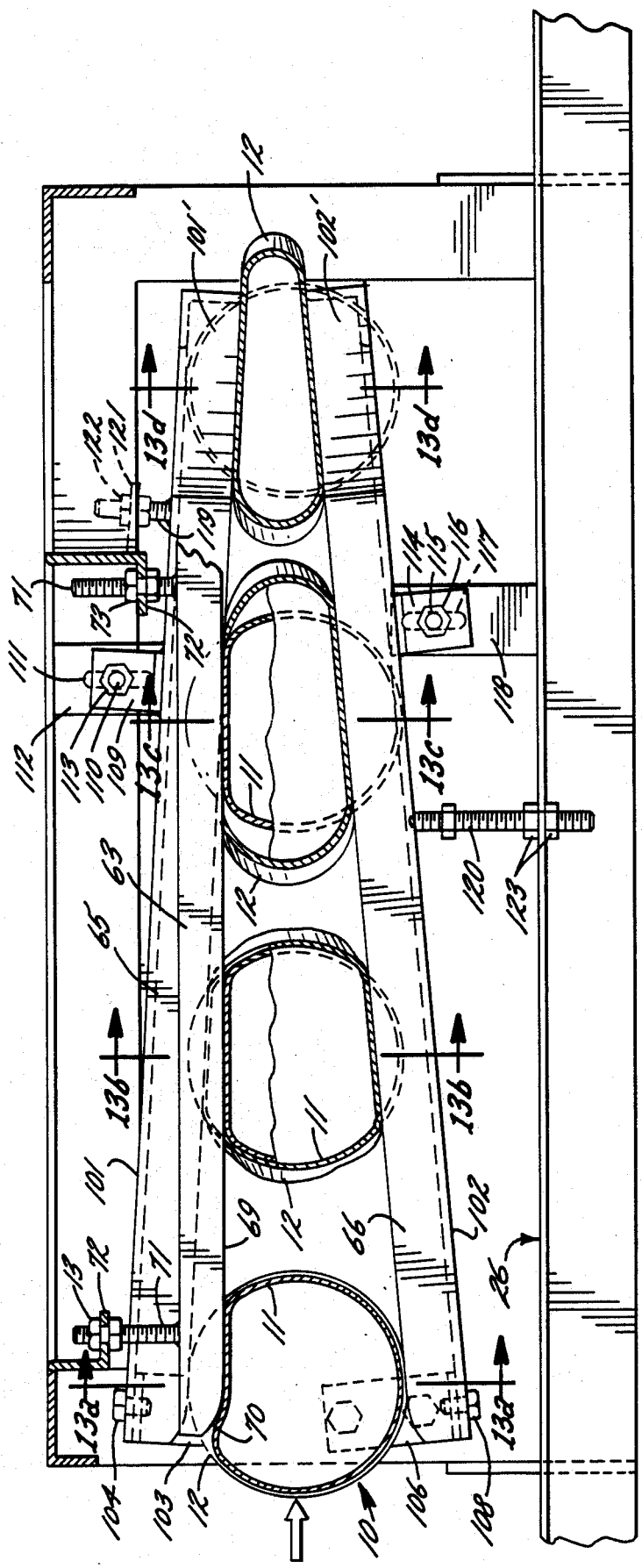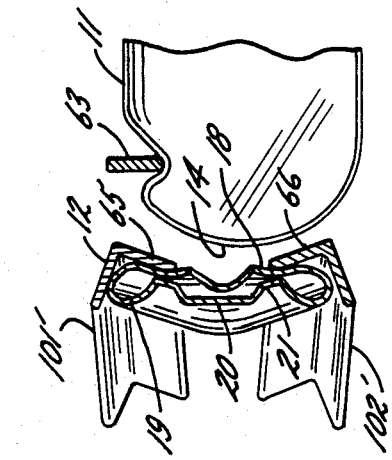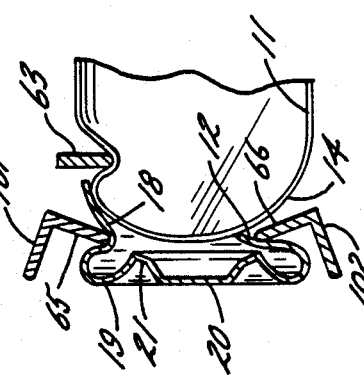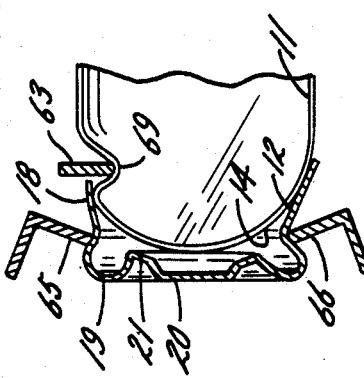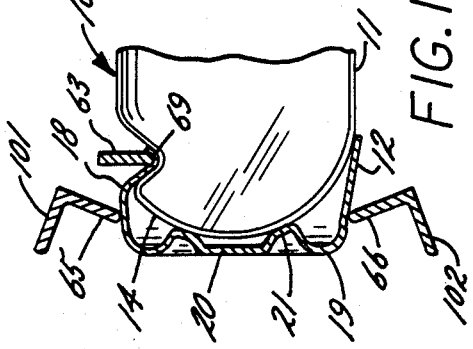

MACHINE FOR REMOVING CAPS AND BASE CUPS FROM PLASTIC BOTTLES

BACKGROUND OF THE INVENTION

This invention relates to plastic bottles of the type commonly used for soft drinks and is concerned with preparing such bottles for recycling. The bodies of bottles of this type often are made of a molded plastic such as a polyester resin and are usually comparatively soft and pliable. In order that the bottle be self-supporting, the bottom of the bottle body is received in and bonded to a base cup which also is molded from a resilient plastic material but is considerably firmer than the body to provide the desired support. Usually, the cup is colored while the body either is clear or colored. The bottle also includes a cap which is threaded onto the necked down upper end of the bottle body.

Empty bottles of this type have a significant value if the materials of the bottle are reclaimed through recycling. Because of the different materials, the bodies, the cups and the caps have to be recycled separately and, preferably, clear bodies also should be recycled separately from colored bodies.

SUMMARY OF THE INVENTION

The general object of the invention is to provide a novel apparatus or machine for rapidly and effectively separating the parts of a plastic bottle of the foregoing type and for sorting and delivering the parts separately so that each type of part may be recycled individually and for accomplishing this through reliable but comparatively simple and inexpensive mechanisms.

A more detailed object is to advance the bottles along a predetermined path and into engagement with stationary elements which utilize the relative movement between the bottles and the elements to separate the caps and the base cups from the bodies of the bottles.

Another object is to not only separate the cups and the caps from the bodies but also to separate clear bodies from colored bodies so that each type may be recycled individually.

The invention also resides in the novel construction and arrangement of the elements for removing the cups and caps from the bodies and in the cooperation of these elements with the other mechanisms of the machine.

BRIEF DESCRIPTION OF THE DRAWINGS

FIG. 1 is a schematic plan view of a machine for removing caps and base cups from plastic bottles and embodying the invention.

FIG. 2 is a perspective view of the machine.

FIG. 3 is an exploded perspective view of a bottle.

FIG. 4 is an enlarged fragmentary sectional view taken along the line 4—4 in FIG. 1.

FIG. 5 is a sectional view taken along the line 5—5 in FIG. 4.

FIG. 8 is an enlarged fragmentary sectional view taken along the line 8—8 in FIG. 7.

FIG. 9 is an enlarged fragmentary sectional view of a portion of FIG. 8.

FIG. 10 is a fragmentary sectional view taken along the line 10—10 in FIG. 8.

FIG. 11 is a fragmentary sectional view taken along the line 11—11 in FIG. 8.

FIG. 12 is a fragmentary sectional view taken along the line 12—12 in FIG. 7.

FIG. 13a is a sectional view taken along the line 13a—13a in FIG. 12.

FIG. 13b is a sectional view taken along the line 13b—13b in FIG. 12.

FIG. 13c is a sectional view taken along the line 13c—13c in FIG. 12.

FIG. 13d is a sectional view taken along the line 13d—13d in FIG. 12.

DETAILED DESCRIPTION OF THE PREFERRED EMBODIMENT

Figure 6:
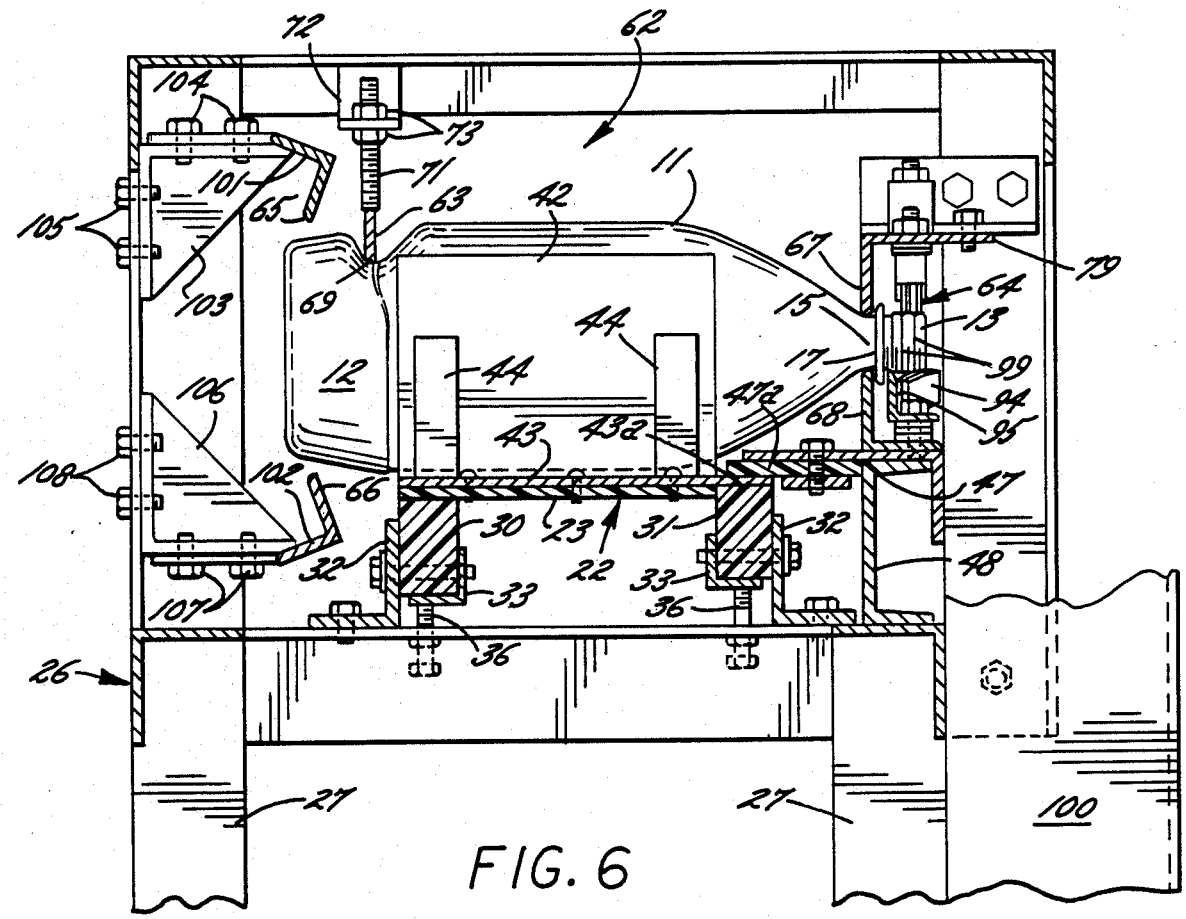
FIG. 6 is an enlarged fragmentary sectional view taken along the line 6—6 in FIG. 1.

As shown in the drawings for purposes of illustration, the invention is embodied in a machine for dismantling a plastic bottle 10 so that the various parts of the bottle may be reclaimed and recycled. Herein, the bottle is of the type commonly used for soft drinks and is made of three parts, that is, a hollow body 11, a support cup 12 and a closure or cap 13 (see FIGS. 3 and 4) all of which are recycled separately. The body is molded from a polyester resin such as polyethylene terephthalate and is relatively soft and pliable. The cup is molded from a plastic material such as high density polyethylene and is comparatively rigid, although somewhat flexible, to receive the bottom portion 14 of the body and support the latter. The upper end portion of the body is necked down at 15 and formed with a thread 16 to receive the cap which is made of any suitable material such as plastic or metal. The body may also include an annular flange 17 which is disposed beneath the thread and which may be grasped to lift a bottle out of a carton or the like.

In the particular form shown, the bottom 14 of the body 11 is rounded and is received in the skirt 18 of the cup 12. The skirt merges with an annular rib 19 which extends around the periphery of the cup and which is even with a flat circular portion 20 at the center of the cup so that the cup, and hence the body, stands on the rib and the center portion. The latter is connected to the rib by an annulus 21 which abuts and is cemented to the bottom 14 of the body to hold the body and the cup together. In some instances, the body is clear while in others it is colored in which case the body is more translucent than transparent. Usually, the cup is made in a color coordinated with the color of the body.

The present invention contemplates the provision of a novel apparatus or machine for rapidly and effectively separating the parts of the bottle 10 and for sorting and delivering the parts separately so that each type of part may be individually collected and recycled. More particularly, the machine includes a carrier 22 which supports the bottles and advances the latter along a predetermined path and mechanisms disposed along the path engage and remove the cap 13 and the cup 12 from the body 11 with each part being discharged from the machine at a different point along the path. In a more detailed aspect of the invention, the machine also separates colored bodies from clear ones. Preferably, the mechanisms which separate the cap and the cup from the body are simply stationary elements which engage the bottle in a novel manner as the latter advances along the path of the carrier and separates the cap and the cup from the body as an incident to the advance of the bottle.

In the present instance, the carrier 22 is an endless conveyor in the form of a belt 23 extending around two horizontal drums 24 and 25 which are alined horizontally so that the belt travels through an upper active run and a lower return run, the active run defining the path along which the bottles are advanced. The drums are journaled to turn about their horizontal axes on a frame 26 which is made up of vertical legs 27 joined by longitudinal side panels 28 and a horizontal top plate 29 (FIG. 4). In the active run, one side edge portion of the belt is supported by a longitudinal rail 30 and the other edge of the belt abuts a parallel rail 31 to prevent lateral drifting of the belt. As shown in FIG. 4, the rails are made of a rigid plastic and each rail is clamped between an angle beam 32 and an L-shaped bracket 33. The horizontal leg of the angle beam is bolted to the plate 29 and screws 34 project through vertical slots in the upright leg and through holes 35 in the rail and are threaded into the vertical leg of the bracket 33. The horizontal leg of the bracket extends under the rail and is engaged by a vertical set screw 36 which is threaded through the plate 29 to adjust the height of the rail as permitted by the slots 35. The drum 24 idles and the drum 25 is driven by a motor 37 (FIG. 1) which is mounted on the frame 26 and turns the shaft 38 on the drum through a gear reduction 39 and a speed reducing chain drive 40. The motor turns in a direction to drive the active run of the belt 23 from left to right as viewed in FIGS. 1 and 2 and, although the belt may be advanced intermittently step by step, herein the belt is driven continuously.

A plurality of holders 41 are carried by the belt 23 and spaced equally along the latter to receive the bottles and to advance them along the active run of the belt. The holders support the bottles on their sides with the bottles extending across the belt so that they are advanced sidewise along the active run. For this purpose, each holder includes a semicylindrical member 42 (FIGS. 4 and 5) which engages the back side of a bottle and extends over and under the latter. The member 42 is welded to a plate 43 and is supported by fingers 44 rigid with and upstanding from the plate behind the member 42, the plate being riveted to the conveyor belt. As shown in FIGS. 4 and 6, the member 42 engages the body 11 of the bottle between the cup 12 and the necked down portion 15. One edge portion 43a of each plate 43 extends beyond the edge of the belt and rides on the rail 31.

Bottles to be dismantled are loaded on the conveyor 22 at a station 45 disposed at the forward end of the frame 26. The bottles are placed in the holders 41 so that all the caps 13 are at the same side of the machine, in this instance, at the front of the frame as viewed in FIGS. 1 and 2. The bottles are inserted from the rear until the caps abut against a vertical plate 46 on the frame so that the bottles are uniformly positioned on the belt 23. As shown in FIG. 4, the plate 46 is welded to a horizontal plate 47 which, in turn, is welded to a channel beam 48 mounted on top of the plate 29 and extending longitudinally along the front of the frame 26. A nylon sheet 47a (FIG. 6) bolted to the plate 47 overlies the edge portion 43a of the belt 43 to stabilize the latter. Although the bottles may be loaded automatically, they are inserted manually in the holders 41 in the embodiment illustrated in the drawings.

In the present instance, means is provided for preventing oversize bottles from jamming the machine after they leave the loading or feed station 45. This means includes a sensor 49 located at a station 50 downstream of the station 45 and disposed slightly above the neck 15 of a properly sized and oriented bottle. The sensor is in the form of a switch 51 (FIGS. 4 and 5) mounted on the frame 26 and having a downwardly projecting actuator 52 abutting the forward end portion 53 of a lever 54. The latter extends longitudinally and is fulcrumed adjacent its rear end on a horizontal cross rod 55 which is stationarily supported by the frame. The weight tends to turn the lever counterclockwise as viewed in FIG. 5 and the lever is held in its normal position by a pin 56 which is engaged by and stops the rear end portion of the lever. The forward tip 57 of the lever is inclined upwardly so that its underside is engaged by an oversize neck and such engagement turns the lever clockwise about the rod 55 to lift the switch actuator 52. This actuates the switch 51 which, through a suitable control circuit (not shown), stops the machine. A stationary ramp 58 disposed beneath the path of the necks of the bottles and forwardly of the sensor 49 is engaged by an oversize bottle and guides the latter into engagement with the lever. The sensor may also be used to stop the machine manually and, for this purpose, a transverse bar 59 is pivoted on the frame by horizontally spaced links 60 and is pivotally connected to the upper end of an arm 61 rigid with and upstanding from the lever. Thus, the switch 49 may be actuated to stop the machine by lifting the bar which, through the arm 61 and the lever, moves the actuator 52 up.

From the sensing station 50, each bottle 10 is advanced downstream to a station or section 62 where both the cup 12 and the cap 13 are removed. Both of these operations are achieved by employing stationary operating elements and by utilizing the advance of the bottle to produce such relative movements between the bottle body 11 and the cup and between the bottle and the cap as is required to separate these parts from the bottle body. Thus, the need for intricate and relatively expensive moving operating mechanisms is avoided. To these ends, each bottle moves into engagement with a longitudinally extending holding element 63 (FIGS. 1, 6 and 7) which bears against the bottle and prevents the latter from turning in the holder 41. At the same time, one or more gripping elements 64 (FIG. 8) engage the cap so that the advance of the bottle causes the cap to roll these elements and to become unthreaded from the bottle body 11. Similarly, at least one and, preferably, two cam elements 65 and 66 (FIG. 12) are engaged by the cup and cam the cup endwise away from the body so that the bond between the cup and the body is broken and the cup is removed from the body. As each bottle enters the station 62, its neck 15 passes between opposed vertical flanges 67 and 68 (FIGS. 6 and 7) which are rigid with the frame 26 and extend longitudinally of the machine near the front of the latter. The flange 17 on the bottle passes in front of the flanges 67 and 68 so that the bottle is held against substantial endwise movement while the gripping and cam elements are removing the cap and the cup.

Herein, the holding element 63 is an elongated bar disposed on edge and extending longitudinally through the station 62 (see FIGS. 1, 6 and 12). The lower edge 69 of the bar is located below the upper level of the bottle 10 and the latter is advanced by the conveyor 22 so that the bar bears down on and buckles in the bottle.

As shown in FIG. 6, the bar is positioned to engage the upper margin of the cup 12 whereby both the cup and the body 11 are deformed by the bar. Due to the yieldable nature of the body and the cup, these parts exert an upward force on the bar and this force prevents the bottle from turning in the holder 41. At the forward end portion of the bar, the lower edge is rounded as indicated at 70 (FIG. 12) to deform the bottle gradually as it enters the station 62. The bar 63 is adjustably supported on the frame 26 by bolts 71 upstanding from and welded to the upper edge of the bar. The screws project through horizontal flanges 72 on the frame and nuts 73 threaded on each screw above and below the associated flange are tightened against the latter to secure the bar at a selected height.

In the form shown in the drawings, a series of three gripping elements 64, 64a and 64b (FIGS. 7 and 8) is disposed at the operating station 62 and these are successively engaged by the cap 13 on a bottle 10 as the latter passes through the station. Each gripping element herein is a blade assembly extending longitudinally over the active run of the belt 23 and disposed alongside the front of the machine in line with the caps on the bottles and each assembly is made up of a number of thin blades disposed side by side as illustrated by the blades 74 in FIG. 10. The bottom edges of the blades are gripping surfaces and herein are serrated, that is, formed with saw teeth 75, 75a and 75b which engage and grip the cap so that the cap does not slide on the blades but rather rolls along the latter as indicated by the arrows 76 in FIG. 8. The blades are positioned on the side of the cap on which such rolling turns the cap in the direction to unthread the cap from the bottle body, in this instance, on the upper side of the cap.

Preferably, the blade assemblies 64, 64a and 64b engage the cap 13 with a progressively lighter force. Thus, the blade assembly 64 engages the cap with a force which causes the teeth 75 to bite into the cap to insure the initial turning and loosening of a cap which is tight on the thread 16. The next blade assembly 64a engages the cap with a somewhat lesser force to keep the cap turning while permitting it to move endwise slightly as required by the thread 16. Finally, the blade assembly 64b contacts the cap with a comparatively light force to continue the turning of the cap while permitting the cap to roll off the end of the bottle.

Each of the blade assemblies 64, 64a and 64b is supported on the frame 26 for vertical adjustment and, to this end, the forward end portion of the assembly 64 is received between the legs of an inverted U-shaped bracket 77 (FIGS. 8, 9 and 10) and a threaded pin 78 rigid with and upstanding from the bracket projects through a horizontal bar 79 of the frame. Between the bracket and the bar, a plurality of washers 80 encircle the pin and a nut 81 is threaded onto the pin 78 and tightened to secure the bracket in place. The height of the bracket is determined by the number of washers 80 used. The assembly 64 is pivotally mounted on the bracket legs by a transverse pin 82 and downward swinging of the toothed portion of the blade assembly is limited by a finger 83 on the forward end of the assembly abutting a stop 84. The latter is the head of vertical bolt 85 which is threaded through the bar 79 and its upper end receives a lock nut 86. Thus, threading the bolt up and down in the bar changes the angular limit position of the blade assembly and provides a fine vertical adjustment for the assembly. The blade assembly is resiliently urged to its limit position by a compression spring 87 which exerts a downward force sufficient to achieve the desired gripping engagement between the teeth 75 and the cap 13. The spring encircles a vertical pin 88 which projects into a vertical sleeve 89 welded to the bar 79 and the lower end of the spring abuts a head 90 on the free end of the pin. The upper end of the spring engages the end of a set screw 91 threaded into the sleeve so that the set screw may be used to adjust force which the spring exerts on the blade assembly. A lock nut 92 threaded onto the upper end of the set screw and abutting the upper end of the sleeve maintains the selected adjustment. Laterally spaced pins 93 depend from the bar 79 and straddle the blade assembly to limit the lateral bending of the assembly. The blade assemblies 64a and 64b are similarly supported and corresponding parts are identified by the same reference characters.

Figure 7:
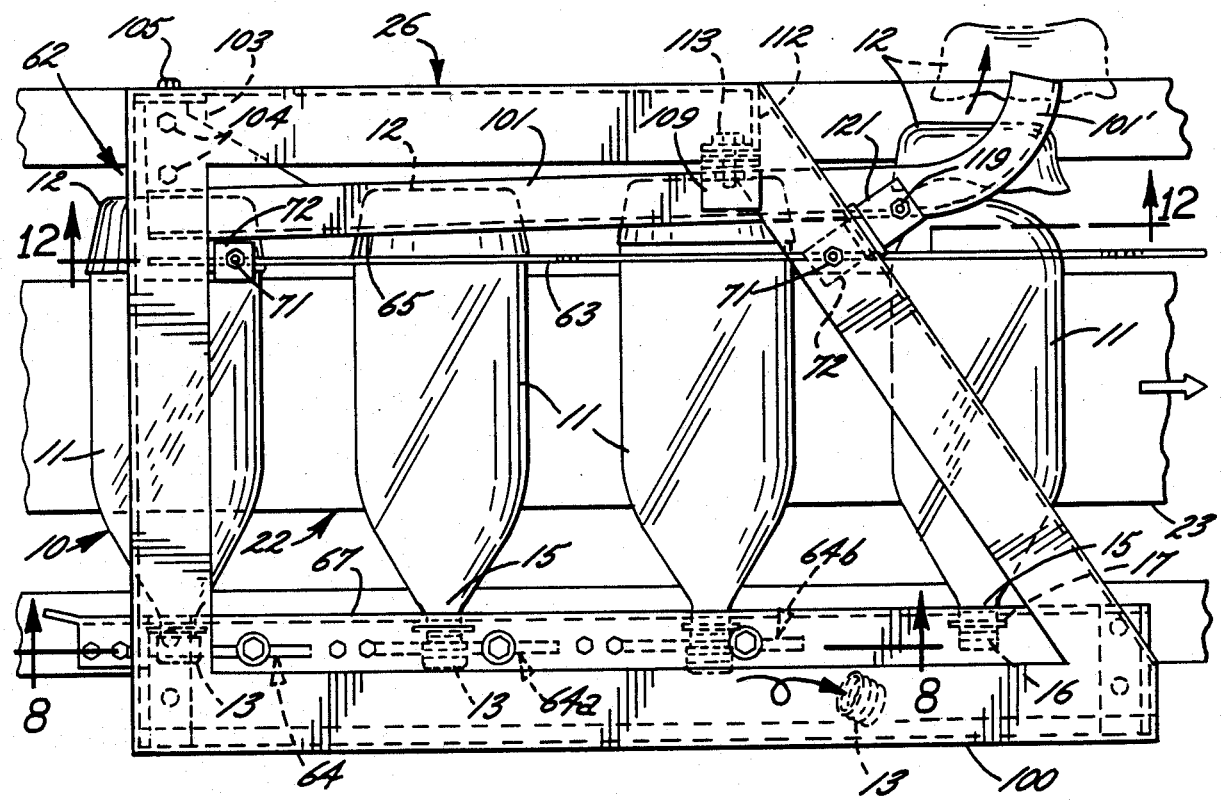
FIG. 7 is an enlarged fragmentary sectional view taken along the line 7—7 in FIG. 2.

To help guide the cap 13 off the thread 16 on the bottle body 11 as the cap is turned by the blade assemblies 64a and 64b, cam members 94 (FIGS. 8 and 11) are disposed beneath these assemblies and engage the cap and resiliently urge the latter outwardly away from the bottle body. Herein, each cam member is an elongated spring finger extending generally longitudinally of the active run of the belt 23 with the forward end of the finger anchored to the upright leg of a horizontal angle bar 95 by a bolt 96. The angle bar parallels the path of the belt and the horizontal leg of the bar is secured to the frame 26 by bolts 97 projecting through the leg and threaded into the frame. The vertical position of the bar and hence of the spring fingers is set by selecting a predetermined number of washers 98 and placing them on the bolts beneath the horizontal leg. As shown in FIG. 11, the free end portion of each spring finger is bent so that it normally is canted outwardly away from the path of the bottles. As a result, the finger engages grooves 99 (FIG. 6) in the cap 13 and the cap thus tends to spring the finger inwardly and, conversely, the finger urges the cap outwardly. Eventually, when the cap is free of the thread 16, one or the other of the fingers pushes the cap away from the end of the bottle as illustrated in FIG. 7 and the cap falls down a sheet metal chute 100 attached to the front of the frame 26.

While the blade assemblies 64, 64a and 64b are removing the cap 13 at the station 62, the cam elements 65 and 66 separate the cup 12 from the body 11 of the bottle 10. As shown in FIGS. 6, 7 and 12, the cam elements are opposing flanges disposed above and below the cup and formed respectively on elongated stationary bars 101 and 102 which extend generally longitudinally of the machine. The bars are inclined toward the longitudinal axis of the bottle and hence toward each other so that the space between the flanges 65 and 66 becomes progressively smaller from the forward end of the station 62 to the rear of the station while the flanges themselves are inclined outwardly. In addition, the bars are canted outwardly (see FIG. 7) and their rear end portions 101' and 102' are formed with a rather sharp outward curve. The forward end of the bar 101 is clamped to a bracket 103 by screws 104 and the bracket, in turn, is mounted on the frame 26 by screws 105 while the forward end of the bar 102 is similarly mounted by a bracket 106 and screws 107 and 108. Downstream of the bracket 103, the bar 101 is supported by an angle bracket 109 which has one leg welded to the bar and the other leg receives a bolt 110 which projects through a vertical slot 11 in a post 112 on the frame with the bracket clamped to the post by a nut 113 on the bolt. A second angle bracket 114 similarly supports the bar 102 by means of a bolt 115 and a nut 116 with the bolt projecting through a vertical slot 117 in a second post 118. To the extent that the bars 101 and 102 are somewhat yieldable, the slots 111 and 117 permit slight vertical adjustment of the bars and such adjustment is achieved by screws 119 and 120. The screw 119 is welded to the top of the bar 101 and projects through a flange 121 on the frame so that the vertical position of the bar is varied by adjusting nuts 122 threaded on the screw above and below the flange. The screw 120 is a vertical set screw threaded through a portion of the frame and abutting the underside of the bar 102 and the position of the screw is held by lock nuts 123.

The progressive effect of the camming flanges 65 and 66 in cooperation with the holder bar 63 is illustrated in FIGS. 12 and 13a through 13d. Thus, at their forward ends, the space between the flanges is slightly greater than the diameter of the cup 12 so that one side of the cup and of the body 11 is pressed down by the bar 63 when the cup engages the flanges (see FIG. 13a). As the bottle advances further into the station 62, the flanges become closer together and bend the skirt 18 of the cup in at a point above the rib 19. The latter remains comparatively rigid so that the flanges effectively grip the cup at the rib as illustrated in FIG. 13b. This, together with the outward canting of the bars 101 and 102, begins to move the cup endwise of the body 11 and breaks the bond between the annulus 21 of the cup and the bottom 14 of the body. Upon the further advance of the bottle, the canting of the bars causes the skirt to begin to clear the bottle body (FIG. 13c) and, as the cup reaches the curved portions 101' and 102' of the bars, the skirt is completely collapsed behind the flanges (FIG. 13d) after which the cup drops onto a horizontal conveyor 124 (FIG. 1) which extends transversely away from the back of the machine and carries the cup to a grinder 125, the ground cup material then being stored in a suitable container 126 for further recycling.

Figure 14:
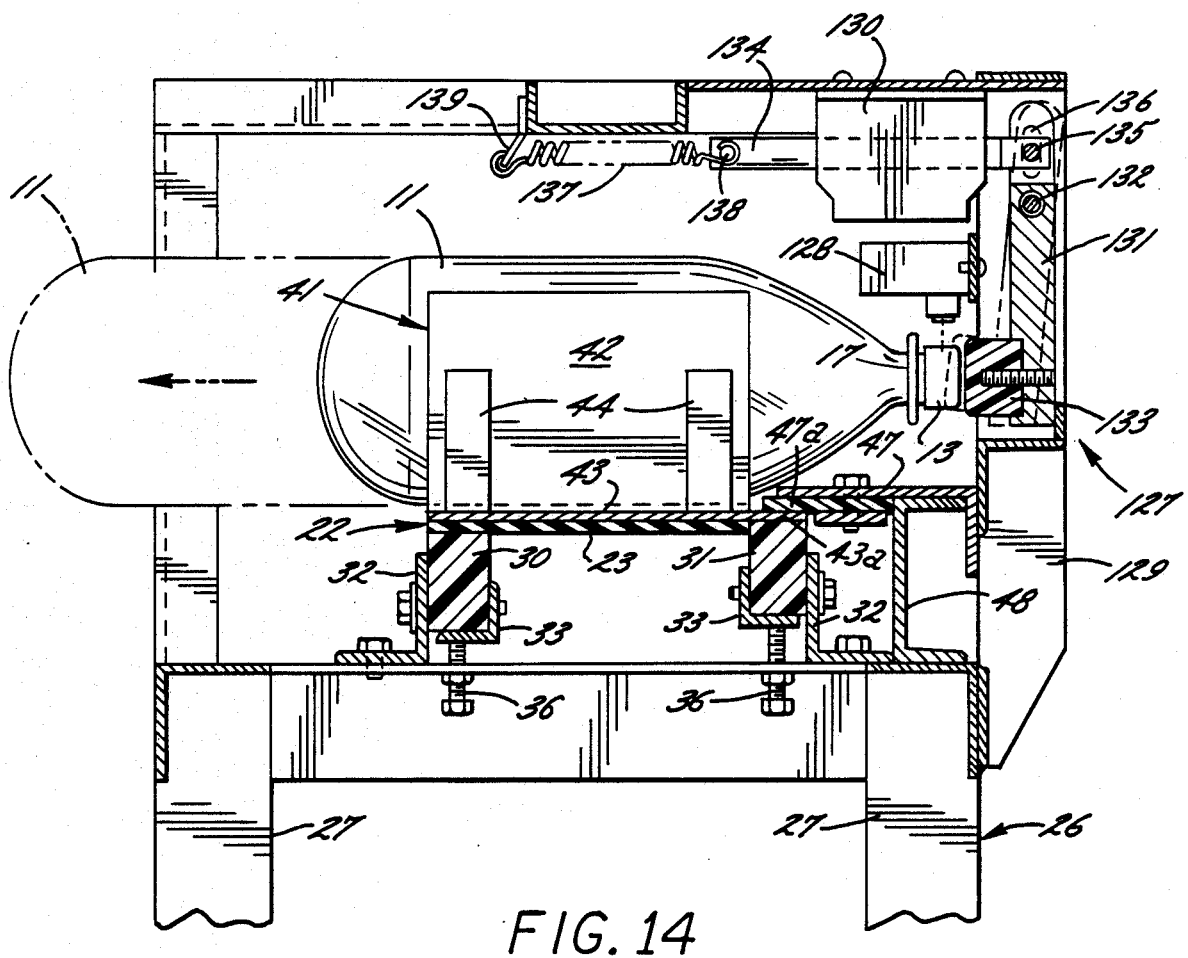
FIG. 14 is an enlarged fragmentary sectional view taken along the line 14—14 in FIG. 1.

Occasionally, the blade assemblies 64, 64a and 64b may fail to remove a cap 13 and, accordingly, means is disposed at a station 127 downstream from the station 62 to detect the presence of a cap remaining on a bottle and to eject any such bottle from the conveyor 22. This means includes, in the form illustrated, a sensing device such as a photoelectric sensor 128 (FIG. 14) which is disposed above the threaded end of the bottle body 11 and which is supported on a post 129 secured to the front of the frame 26. The sensor detects the presence or absence of a cap and, when a cap is present, it energizes an actuator 130 which operates a mechanism for ejecting the bottle with the cap. The ejecting mechanism includes an upright lever 131 fulcrumed on the post 129 by a horizontal pin 132 so that the lower end of the lever swings toward and away from the top of a bottle at the station 127 and a bumper pad 133 on this end kicks the bottle out of the holder 41 when it is swung toward the bottle. The actuator 130, which may be electric or pneumatic as desired, swings the lever through a horizontal rod 134 which is pivotally joined at one end to the upper end of the lever by a pin and slot connection 135, 136. A contractile spring 137 acts between a pin 138 on the other end of the rod and a stationary anchor 139 on the frame to urge the rod to the left as viewed in FIG. 14 and normally hold the lever in its upright or solid line position. When the actuator is energized, it moves the rod to the right to swing the lever to the broken line position and kick the bottle out of the holder 41. The bottle is received by a second horizontal conveyor 140 (FIG. 1) which extends transversely of the frame and carries the bottle away from the machine.

A bottle body 11 which has had the cap 13 removed moves through the station 127 and is advanced to a station 141 where a second sensor 142 determines whether the bottle body is colored or clear. This sensor also is mounted on the frame 26 (see FIG. 2) above the lower end of the bottle body and controls an actuator 143. A clear body is transparent while a body with color is somewhat translucent and the sensor 142 detects this difference to energize the actuator 143 when a clear body is at the station and to eject that body from the holder 41 through a mechanism 131a virtually identical to the ejecting mechanism 131 at the station 127. The controls (not shown) which are responsive to the sensors 128 and 142 and which energize the actuators 130 and 143 may be of any suitable type well known in the art and are conveniently located in a box 144 on the front of the frame 26. A clear body ejected at the station 141 is deposited on a third horizontal conveyor 145 which extends transversely from the back of the machine and carries the body to a grinder 146, the ground particles then being stored at 147.

Only colored bottle bodies 11 remain on the conveyor 22 beyond the station 141 and these bodies are carried to the end of the active run of the belt 23 where, the belt passes around the drum 25, the bodies fall by gravity out of the holders 41 and onto a fourth horizontal conveyor 148. One end of the latter is disposed alongside the end of the machine to receive the bodies and the conveyor extends back away from the machine to another grinder 149, a separate storage means 150 being associated with this grinder.

It will be observed that the machine of the present invention is effective to separate both the cap 13 and the cup 12 from the body 11 of the bottle 10 all on a single pass along the active run of the conveyor belt 23. Moreover, this is accomplished without the use of complicated and expensive mechanisms. Instead, stationary operating elements are used and the advance of the bottles by the conveyor is employed to provide relative movement between the elements and the bottle parts. Thus, as the bottles move through the operating station 62, the bottles are held against turning by the stationary bar 63 while the stationary blade assemblies 64, 64a and 64b grip the caps so that the advance of the bottles results in the caps being unthreaded from the bottle bodies. At the same time, the stationary cams 65 and 66 progressively separate the cups from the bodies as the bottles advance through the station 62. The bodies of the bottles then are sorted by the presence of color to complete the separation of the bottle parts for individual recycling.

I claim:

1. Apparatus for handling plastic bottles of a type which comprises a main body portion formed of a non-biodegradable plastic which can be ground into reusable form, a narrow neck integral with one end of the main body portion, a closure cap secured to the neck and a hard plastic base cup secured to another end, comprising
   (a) means for automatically advancing the plastic bottles in a moving stream from a storage location to a grinding location, said grinding location including means for grinding the main body portions of the bottles, (b) said means for automatically advancing the plastic bottles including means for orienting the plastic bottles into a predetermined orientation as the plastic bottles move in the stream and for moving the plastic bottles in said predetermined orientation through a decapping location and a base cup removing location as it moves said plastic bottles toward the grinding location, (c) decapping means at said decapping location for removing the closure caps from bottles moving in the stream through sais decapping location, and (d) base cup removing means at said base cup removing location for removing the hard plastic base cups from plastic bottles moving in said stream through said base cup removing location, said base cup removing means including force applying means which applies forces inwardly against the main body portion of a bottle and then in a direction away from the neck of the bottle on the base cup of the bottle to partially crush the main body portion of the bottle and to strip the base cup from the main body portion of the bottle, the force applying means applying inwardly directed forces against the main body portion of the bottle above the top of the base cup to partially crush the main body portion of the bottle above the top of the base cup during stripping of the base cup from the main body portion.

2. Apparatus for dismantling plastic bottles by separating a threaded cap and a comparatively rigid bottom cup from a flexible bottle body, said apparatus having, in combination, carrier means for advancing a bottle sidewise along a predetermined path, means for holding the bottle against turning as the bottle is advanced along the path, means disposed alongside said path for engaging and unthreading the cap from the bottle body as the bottle advances along the path with the cap in engagement, means disposed alaong said path for engaging and removing the cup from the bottle body, sensor means disposed along said path for detecting the color of the bottle body, and means responsive to said sensor means and operable after the cap and the cup have been separated from the body for removing the body from the bottle carrier means in a direction that is selected according to the color of the bottle body as detected by the sensor means after the cap and the cup have been separated from the bottle body, and further sensing means disposed along said path beyond said engaging and removing means for sensing a cap remaining on the bottle body, and means, responsive to said further sensing means, for removing such a bottle body with a cap from said carrier means.

3. Apparatus as defined in claim 2 in which said means for holding the bottle against turning is an elongated bar extending longitudinally of said path adjacent said engaging and unthreading means, and said engaging and removing means are engageable by the bottle so that one side of the bottle body is flexed inwardly as the bottle is advanced along the bar.

4. Apparatus for dismantling plastic bottles by removing a cap threaded onto the top of a comparatively soft and flexible plastic body, and by removing a flexible but comparatively rigid plastic bottom cup which has its bottom bonded to the bottom of the body and its skirt encircling a portion of the body, said apparatus having, in combination, carrier means for advancing a bottle sidewise along a predetermined path, means for holding the bottle against turning as the bottle is advanced along said path, first elongated cam means extending generally longitudinally of said path for engaging one side of the skirt on the bottom cup during a portion of the advance of the bottle, said cam means being positioned so that the skirt is flexed radially inwardly behind the bottom of the body, and said cam means being inclined toward an axis of the bottle so that such flexing is progressively increased as the bottle is advanced along the cam means, said cam means also being canted outwardly so that the cup is moved endwise away from the body of the bottle, a second cam means, opposing and spaced from said first cam means for engaging and flexing another side of the skirt, said second cam means being inclined toward said first cam means so that the cup is progressively gripped by the two cam means, said second cam means being canted with said first cam means so that the bond between the cup and the body is broken, and so that the cup and the body are separated from each other during the advance of the bottle along both cam means, a plurality of elongated blade means disposed end to end and extending along said path parallel to the path, which blade means are passed successively by the bottle, each of said blade means having a serrated surface which engages the cap as the bottle is advanced along said path so that the cap rolls on the surface and turns relative to the bottle during the advance of the body, so that the cap becomes unthreaded from the body of the bottle, and yieldable means for acting on said blades and resiliently urging each surface into gripping engagement with the cap, so that each surface grips the cap with a lesser force than its immediately preceding surface.

5. Apparatus as defined in claim 4 in which said means for holding the bottle against turning is an elongated bar extending longitudinally of said path adjacent both cam means said blade means, and which bar engages the bottle so that one side of the body is flexed inwardly as the bottle is advanced along the bar.

6. Apparatus as defined in claim 4 including sensing means, disposed along said path beyond said blades, for sensing a cap remaining on the body, and means responsive to said sensing means for removing such a body with a cap from said carrier means.

7. Apparatus as defined in claim 4 including sensor means, disposed along said path beyond both cam means and said blade means, for sensing the color of the body, and means responsive to said sensor means for sorting successive bodies according to the color of the body.

* * * * *

UNITED STATES PATENT AND TRADEMARK OFFICE
CERTIFICATE OF CORRECTION

PATENT NO. : 4,726,535

DATED : February 23, 1988

INVENTOR(S) : Dale A. Snyder

It is certified that error appears in the above-identified patent and that said Letters Patent is hereby corrected as shown below:

Col. 3, line 27, delete "on" (second occurrence) and substitute --of--

Col. 6, line 67, delete "11" and substitute --111--

Col. 8, line 29, insert --as-- before the word "the" (first occurrence)

Claim 1, col. 9, line 12, delete "sais" and substitute --said--

Claim 2, col. 9, line 43, delete "alaong" and substitute --along--

Claim 4, col. 10, line 41, delete "bottle" and substitute --body--
line 42, delete "body" and substitute --bottle--

Claim 5, col. 10, line 51, insert --and-- after "means" (first occurrence)

Signed and Sealed this

Sixteenth Day of May, 1989

Attest:

DONALD J. QUIGG

Attesting Officer

Commissioner of Patents and Trademarks